A. C. MASON & A. T. STURT.
SUPPORT FOR MOTOR VEHICLE POWER PLANTS.
APPLICATION FILED JUNE 12, 1916.
1,285,767.
Patented Nov. 26, 1918.
5 SHEETS—SHEET 5.
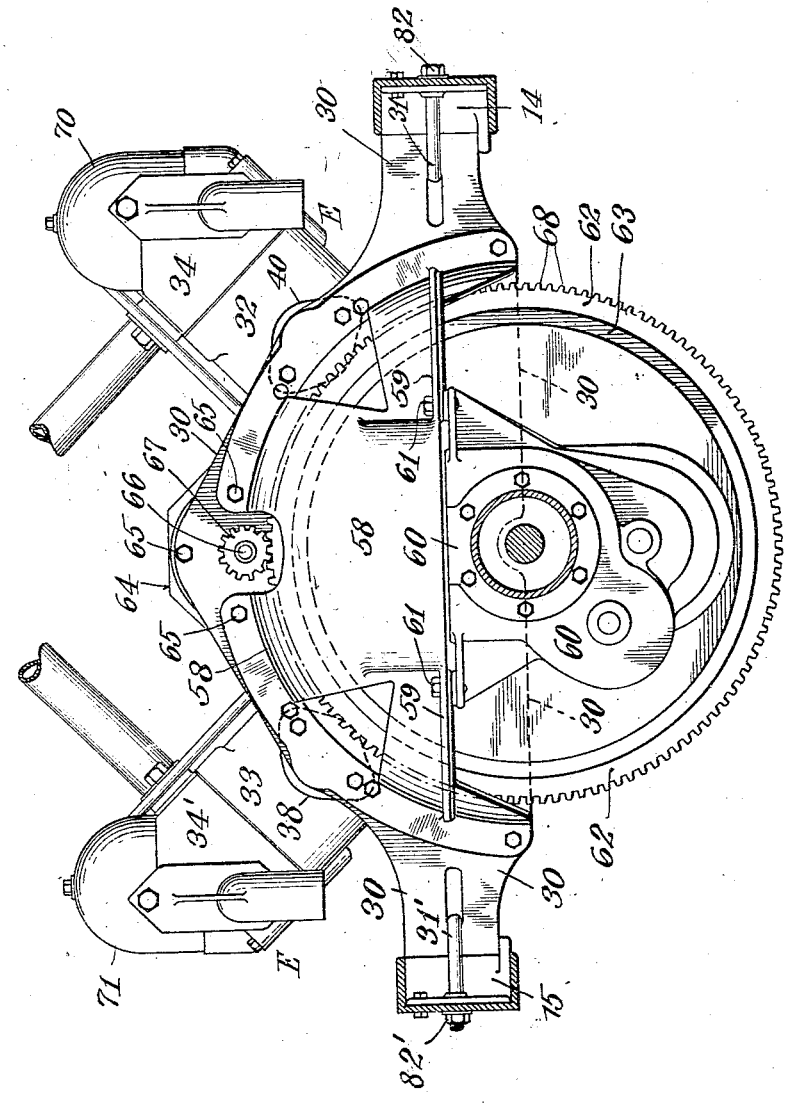

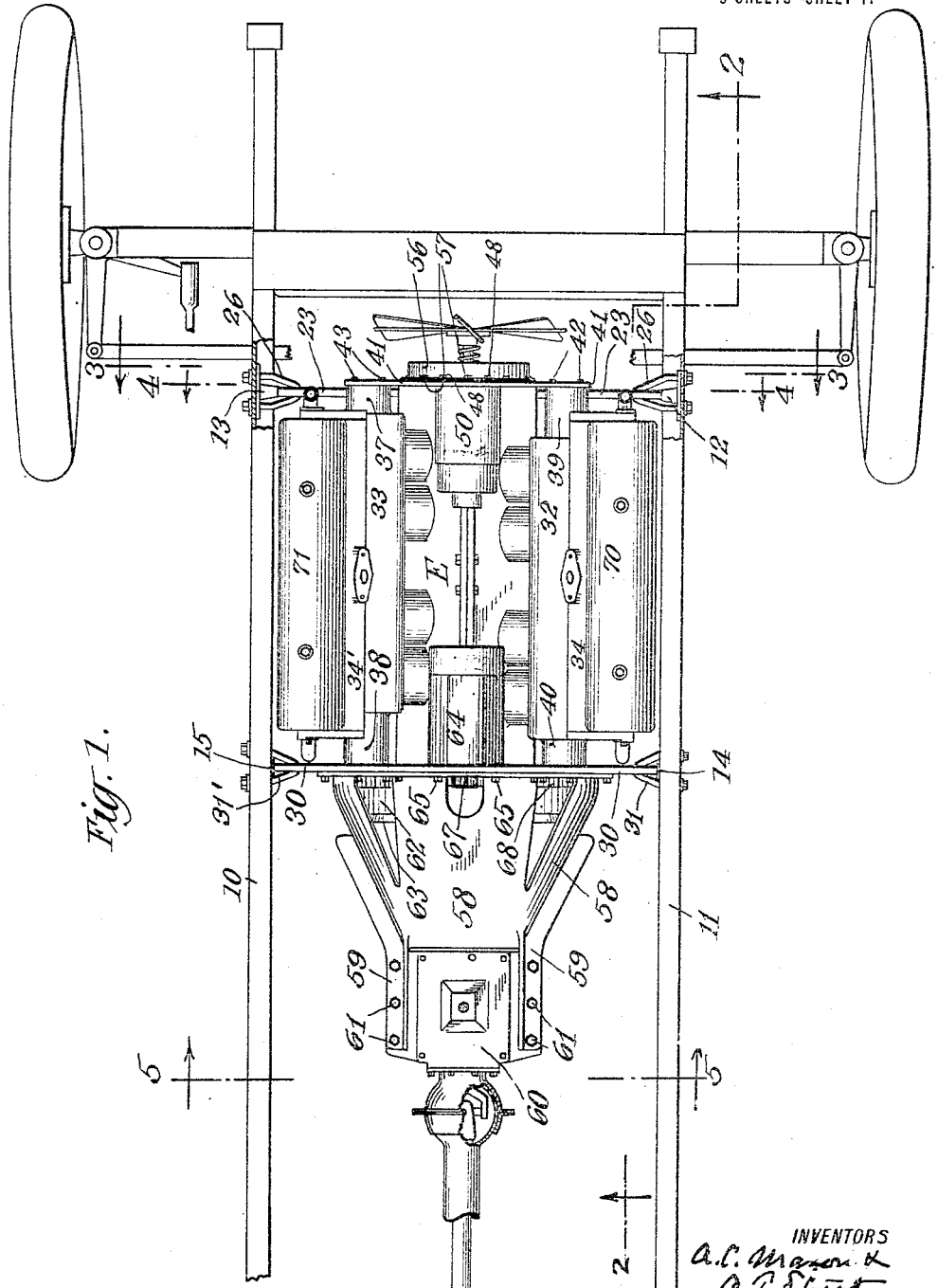

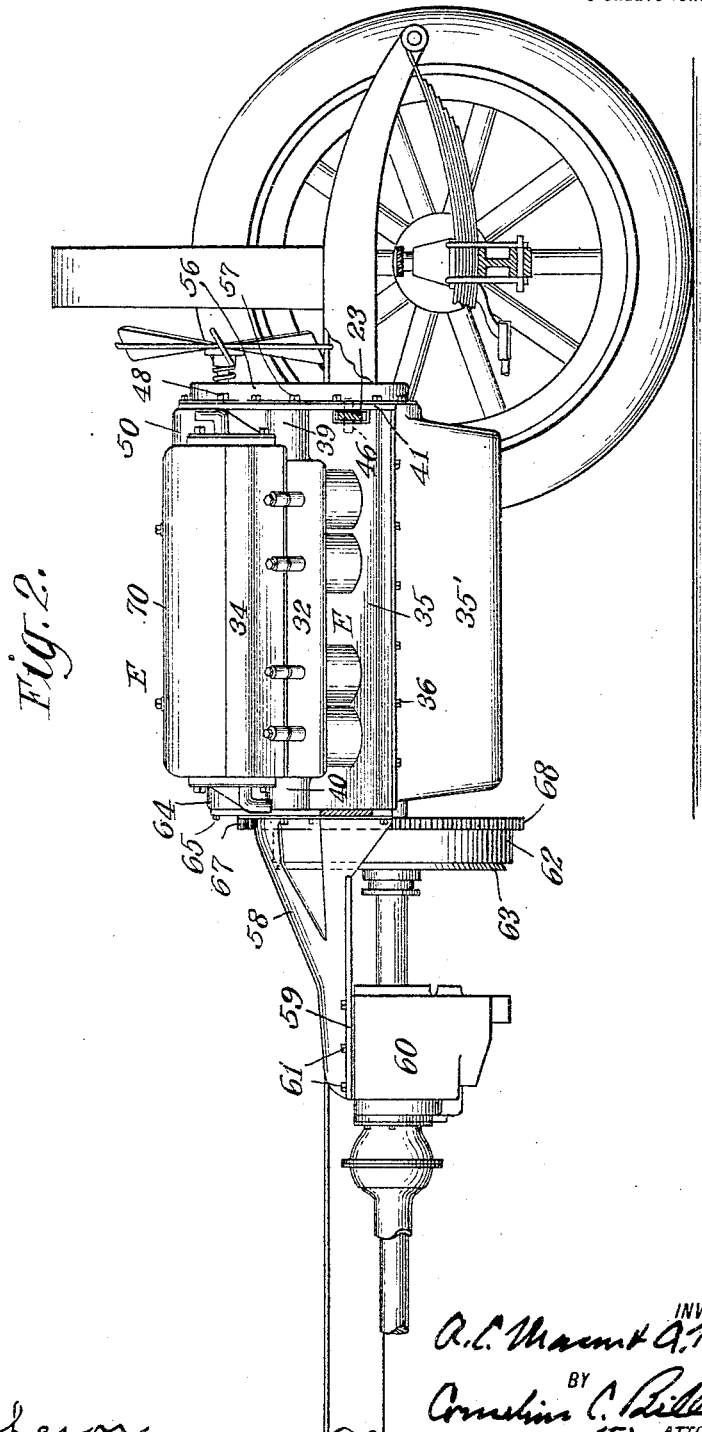

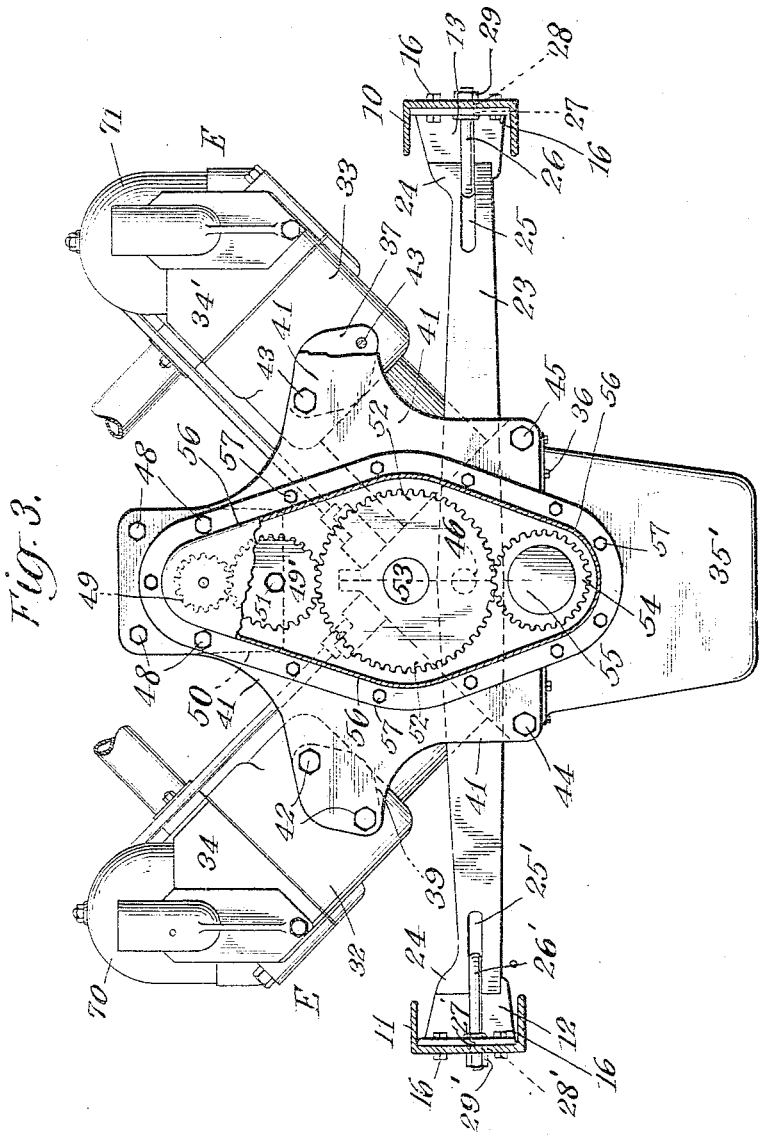

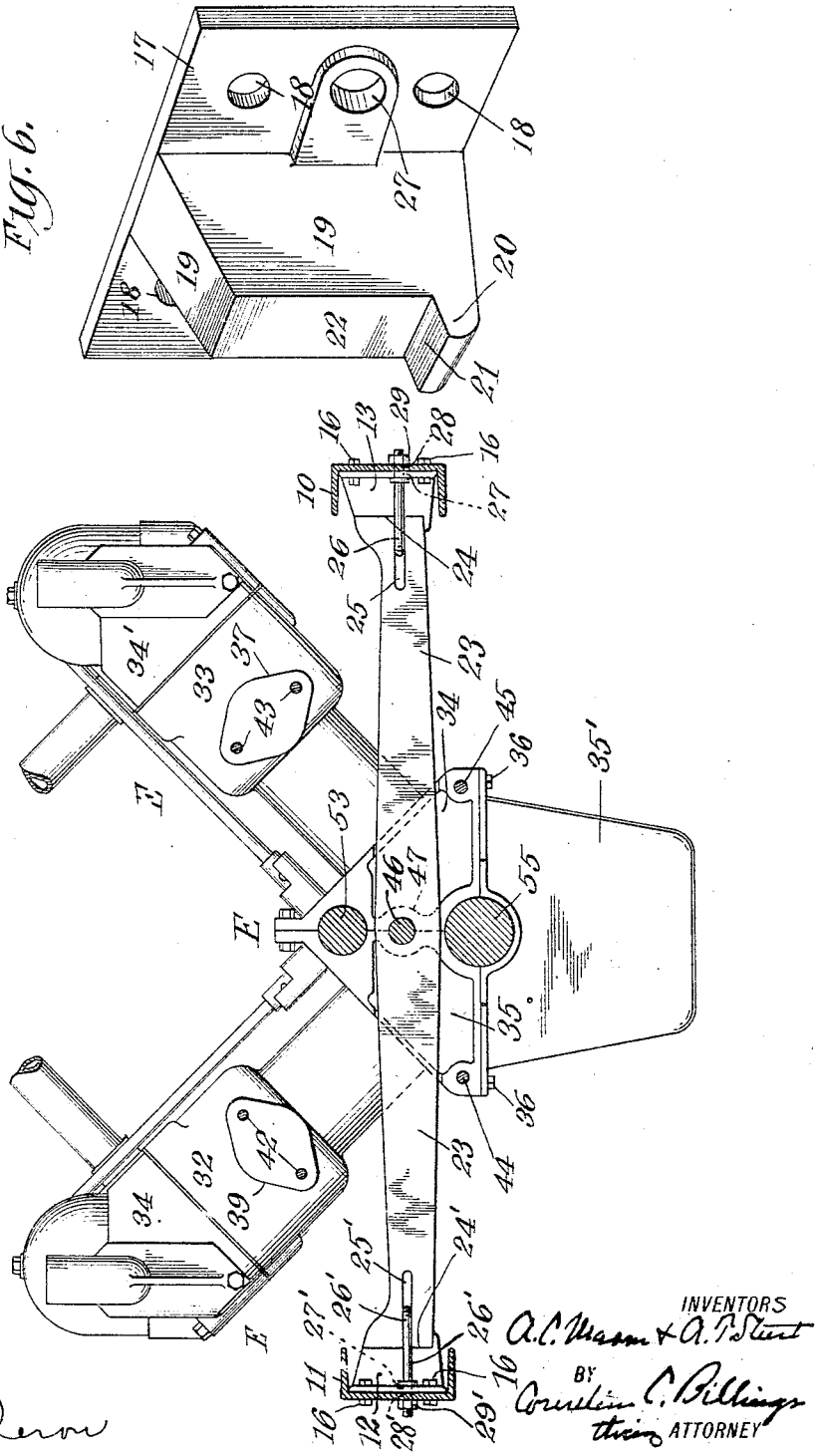

UNITED STATES PATENT OFFICE.

ARTHUR C. MASON AND ALFRED T. STURT, OF FLINT, MICHIGAN, ASSIGNORS TO CHEVROLET MOTOR COMPANY, OF NEW YORK, N. Y., A CORPORATION OF DELAWARE.

SUPPORT FOR MOTOR-VEHICLE POWER PLANTS.

1,285,767.   Specification of Letters Patent.   Patented Nov. 26, 1918.

Application filed June 12, 1916. Serial No. 103,108.

*To all whom it may concern:*

Be it known that we, ARTHUR C. MASON and ALFRED T. STURT, citizens of the United States, and residents of the city of Flint, county of Genesee, State of Michigan, have jointly invented certain new and useful Improvements in Supports for Motor-Vehicle Power Plants; and we do hereby declare the following to be a full, clear, and exact description thereof.

This invention relates to improvements in the supports for a motor vehicle power plant, comprising a plurality of transverse members which are secured to the chassis in a novel manner. The invention is particularly adapted for mounting an eight cylinder engine of a V-type, although of course, the invention is not restricted to the support of an engine of any particular number of cylinders or type.

One of the objects of the invention is to provide a supporting structure independent of the engine and to do away with the necessity of casting supporting arms or their equivalents on the engine. Another object is to provide a supporting structure that can be made of sheet steel punchings and which will permit of the use of a V-type of engine made of duplicate castings bolted together. Another object is to provide a structure which is inexpensive to manufacture yet which is strong, light in weight, very efficient in use and easily assembled and taken apart. A still further object is to render very easy of access all parts of the machinery mounted thereon. Another object of the invention is to provide a simple yet efficient support so that it may be readily attached to or detached from the chassis. Other objects will appear from the following description and claims.

In the embodiment of the invention illustrated in the drawings and which will be hereinafter described, the rear end of an eight cylinder V-type of engine is bolted directly to one of the transverse members and the front of the engine is bolted to an intermediate member which is supported by the front transverse member in such manner that it may have a slight axial movement.

The transverse members of the intermediate member above referred to are preferably constructed of heavy gage sheet steel punchings and form a means of support for the complete power plant, including the engine, the transmission, the starting motor and the generator, and one of the transverse members also forms a support for the housing of the train gear. The use of this supporting structure permits the construction of a V-type eight cylinder engine by bolting together two castings which are identical; in other words, these castings are duplicates and thereby eliminate the necessity of making the castings rights and lefts which is necessary if the supports are integral with the said castings.

Referring to the drawings in which similar reference characters indicate the same parts in the several views:

Figure 1 is a plan view of the front portion of a chassis showing the supporting members and the parts carried thereby.

Fig. 2 is a section on staggered line 2—2 of Fig. 1 of the portions of the engine equipment and connections shown in elevation.

Fig. 3 is an enlarged transverse section on line 3—3 of Fig. 1, showing the front and intermediate supporting members, the gear housing being partly in section.

Fig. 4 is a similar view to Fig. 3 taken on line 4—4 of Fig. 1, in a plane just to the rear of the intermediate supporting member, the securing means shown in elevation.

Fig. 5 is a section taken on line 5—5 of Fig. 1, showing the rear supporting member and the transmission mounting.

Fig. 6 is a detail view in perspective of one of the brackets designed to be secured to the chassis to form seats for the transverse supporting members.

Referring to the embodiment of the invention shown in the accompanying drawings, 10 and 11 are the side members of the chassis, and secured to these side members by means of suitable bolts 16 are the brackets 12, 13, 14 and 15. These brackets (one of which is shown in Fig. 6) are all similar in shape and construction and comprise a body portion 17 having holes 18 therein for the reception of the bolts 16. Extending perpendicularly to the portion 17 and in the center thereof, is a projection 19 which is provided with a horizontal step or shelf 20 at the lower portion thereof. This step comprises a horizontal supporting surface 21 extending at right angles to the vertical surface 22, and is thus adapted to form a seat for one end of a transverse supporting member. At the lower corners of the body portion 17, are provided holes 27 to receive the ends of a supporting yoke 26 which will be more particularly hereinafter described.

The brackets 12, 13, 14 and 15 are secured to the longitudinal beams of the chassis by the bolts in any suitable location, depending upon the size of the engine and then the ends of the transverse supporting members are seated on the steps 20 of the brackets. The particular arrangement will now be described.

Supported upon the brackets 12 and 13 at the front of the chassis is a transverse supporting member 23 which is symmetrical in shape and is preferably a heavy sheet steel punching. At its ends 24 it is squared to fit the steps of the brackets 12 and 13, and is provided with slots 25 and 25'. This transverse member is securely held upon the seats of the brackets 12 and 13 by U-shaped bolts 26 and 26' which pass respectively through the slots 25 and 25', the free ends of which pass through the holes 27 in the brackets and holes 28 and 28' in the chassis which register with the holes 27 and 27'. It will be readily seen that by tightening the nuts 29 and 29' that the U-bolts will effectively hold the transverse member 23 on the step-shaped seats 20 of the brackets 12 and 13, and that by the mere loosening of the nuts 29 and 29' the transverse supporting member will be made free for removal.

The rear transverse supporting member 30 is secured to the brackets 14 and 15 in a similar manner to that just described with reference to the transverse supporting member 23, by means of the U-bolts 31 and 31' and nuts 82 and 82'. The entire power plant and also the transmission is supported by the transverse members 23 and 30.

The engine E is preferably of an eight cylinder V-type which is formed by bolting together two cylinder block castings 32 and 33 which are identical in shape and which, in fact, are duplicates of each other. To each casting is secured a cylinder head 34 and 34' carrying suitable valves, which cylinder heads are also identical with each other and are in fact duplicates.

The upper half of the crank casing 35 is formed integral with the cylinder castings and the lower half is formed of sheet metal stamping 35' secured to the upper half by suitable bolts 36.

Referring more particularly to Figs. 1, 3, 4 and 5, the cylinder block casting 33 is provided with two longitudinally extending lugs 37 and 38, and the cylinder block casting 32 is provided with similarly arranged lugs 39 and 40. The lugs 37 and 39 are made the same length respectively, as the lugs 40 and 38 for reasons to be presently described.

Due to the fact that the engine is made up of parts which are identical in shape and bolted together, the length of the lugs 39 and 40 of the block 32 are equal, respectively, to the length of the lugs 38 and 37 of the block 33.

The lugs 38 and 40 of the blocks 33 and 32 abut and are secured to the transverse member 30 which, like the transverse member 23, is a heavy flat steel stamping.

From the foregoing it will be seen that the difference in length of the lugs 38 and 37 is equal to the difference in length of the lugs 39 and 40, and therefore the offset of the two cylinder blocks is equal to this difference in length. This offset relationship of the cylinders in block 32 with respect to the cylinders in block 33 permits of a symmetrical arrangement of the crank shaft.

A flat steel plate or stamping 41, which we have termed the intermediate supporting plate, is secured to the lugs 39 and 37 of the blocks 32 and 33 by suitable bolts 42 and 43, and at its lower corners the plate is secured to the blocks 33 and 32 by bolts 45 and 44, as clearly shown in Fig. 3. A pin 46 is secured in a boss 47 formed by the two engine blocks and passes through the front transverse supporting member 23 and the intermediate plate 41. This pin 46 is the only connection between the engine and the supporting member 23 and it forms an axial connection between the engine and the said supporting plate or member.

By means of this construction the chassis will be permitted to deflect slightly due to road strains without putting an appreciable amount of strain on the engine.

The generator 50 is secured to the intermediate plate 41 by bolts 48 and carries a pinion 49 which meshes with an idler 49' supported on a stud 51 secured to the intermediate plate 41. The idler 49' also meshes with a gear 52 secured to the cam shaft 53 and is driven by a smaller gear 54 carried by the crank shaft 55. A housing 56 is secured by a plurality of bolts 57 to the intermediate plate 41, and covers the above described gearing.

To the rear of the supporting plate 30 is secured a bell shaped bracket 58 having rearwardly extending arms 59, to which arms the transmission 60 is secured by bolts 61. The brackets 58 also form a partial housing for the fly wheel 62 and the clutch 63. A starting motor 64 is mounted on the rear transverse supporting member 30 and held securely in place by bolts 65. The shaft 66 of the starting motor 64 passes through the upper portion of the supporting plate 30 and carries a gear 67 thereon which is adapted to be engaged at will with the teeth 68 of the fly wheel 62 by suitable shifting means not shown. 70 and 71 are bonnets or closing caps suitably shaped to be secured by suitable means to the cylinder heads 34 and 34' of the engine.

From the foregoing description it will be seen that an efficient supporting structure is produced to accommodate and support an engine of the V-type and also to afford a means of support for the transmission, generator and starting motor. The plates forming the supporting structure are all of symmetrical design and therefore there are no rights or lefts contained within the assembly. These plates are punched from heavy gage sheet metal and all the bolt holes are also punched therein, making the structure a very economical one to manufacture, yet a very simple one to assemble and take apart, forming a strong and efficient support.

As many changes could be made in the above construction and many apparently widely different embodiments of my invention could be made without departing from the scope thereof, we intend that all matter contained in the above description or shown in the accompanying drawings shall be interpreted as illustrative and not in a limiting sense.

We desire it also to be understood that the language used in the following claims is intended to cover all of the generic and specific features of the invention herein described and all statements of the scope of the invention, which, as a matter of language, might be said to fall therebetween.

Having now described our invention, what we claim as new and desire to secure by Letters Patent is:

1. A supporting structure for an automobile power plant, comprising a chassis, an engine, a plurality of transverse members detachably secured thereto, and an intermediate member rigidly secured to the engine and pivotally connected to one of said transverse members.

2. A supporting structure comprising a chassis, a plurality of supporting members, an engine, an intermediate member rigidly and detachably secured to said engine, said engine being secured to one of the supporting members and said intermediate member being pivotally secured to the other supporting member.

3. A supporting structure comprising a chassis, a plurality of detachable supporting members, an intermediate member pivotally secured to one of the supporting members, and an engine, said engine being rigidly secured to said intermediate member and to one of the supporting members.

4. A supporting structure comprising a chassis, a plurality of supporting members, an intermediate member axially secured to one of the supporting members, and an engine, said engine being rigidly secured to said intermediate member and to one of the supporting members.

5. A supporting structure comprising a plurality of slotted transverse members, a chassis, means secured to said chassis for supporting said transverse members, and detachable means coöperating with slots in said transverse members for detachably securing said transverse members to said supporting members.

6. In a supporting structure, a chassis, a plurality of brackets secured to said chassis, a plurality of slotted transverse supporting members secured to said brackets, and U-bolts coöperating with slots in said transverse member for removably securing said transverse members to said brackets.

7. In a supporting structure for an automobile power plant, a generator, a plurality of transverse supporting members pivotally connected to one of said supporting members, and an intermediate member provided with means for supporting said generator.

8. In a supporting structure for an automobile power plant, a chassis, a bracket provided with a slotted transverse supporting member, said bracket being provided with a step for supporting said transverse member, and means associated with the slots in said transverse members for removably securing said transverse member to said chassis.

9. In a supporting structure for an automobile power plant, an engine, a chassis, a transverse supporting member detachably secured to said engine, and U-bolts removably secured to the transverse supporting member and the chassis.

10. In a supporting structure, a chassis, an engine, a plurality of brackets each of which is provided with a seat, a supporting member detachably secured to said engine, an intermediate member rigidly secured to said engine, a second supporting member pivotally secured to said intermediate member, and detachable means for securing said supporting members to the aforesaid brackets.

11. In a supporting structure for an automobile power plant, a chassis, an engine, a transmission, a starting motor, a rear transverse supporting member, said transmission being secured to the rear face of said supporting member, and said engine and starting motor being secured to the front face thereof.

12. In a supporting structure for an automobile power plant, an engine, a chassis, a starting motor, a transmission supporting bracket, a rear transverse supporting member having said engine and said starting motor secured to one face thereof and said transmission supporting bracket secured to the other face thereof.

13. In a supporting structure for an automobile power plant, an engine, a chassis, a starting motor, a transmission supporting bracket, a rear transverse supporting member having said engine and said starting motor secured to one face thereof, and said transmission supporting bracket secured to the other face thereof, a generator, an intermediate member secured to said engine, and supporting said generator, and a front supporting member pivotally connected to said intermediate member.

14. In an automobile power plant supporting structure, a chassis, an engine, a transmission, a rear flat transverse supporting member, said engine being secured to one face thereof, and means for supporting the transmission on the opposite face thereof.

15. In an automobile power plant supporting structure, a chassis, an engine, a transmission, a starting motor, a rear supporting member consisting of a flat plate, secured to the engine and being provided with means for supporting said transmission and starting motor.

16. In a supporting structure for an automobile power plant, an engine, a transmission, a flat transverse plate secured to the rear face of said engine, means carried by said plate for supporting said transmission, an intermediate member secured to the front face of said engine, a front transverse supporting member, an axial pin pivotally connected to said intermediate member with said front transverse supporting member.

17. In a supporting structure for an automobile power plant, an engine, a transmission, a starting motor, a rear transverse supporting plate secured to the rear face of said engine, means carried by said rear transverse supporting plate for supporting said transmission, means for securing said starting motor to said rear transverse plant, an intermediate member secured to the front face of said engine, a front transverse supporting member pivotally secured to said intermediate member.

18. In a supporting structure for an automobile power plant, a chassis, an engine, a rear supporting member rigidly secured to said engine and detachably secured to said chassis, an intermediate member secured to the front of said engine, a housing secured to said intermediate member, timing gears for said engine mounted adjacent to said intermediate member and inclosed by said housing, a front transverse supporting member pivotally connected to said intermediate member and removably secured to said chassis.

19. In an automobile structure, a chassis, a transverse supporting member, a bracket having a flanged portion projecting therefrom to engage an end of said supporting member, a seat on said bracket for said supporting member, and a U-bolt straddling said flanged portion for securing the transverse supporting member and bracket to the chassis.

20. In an automobile supporting structure, a chassis, a bracket secured thereto, said bracket provided with a flanged portion and a supporting lug, and a transverse supporting member resting on said supporting lug adjacent thereto, and closely fitting between the lug and the face of the flange, a U-bolt passing through a slot in the supporting member and engaging one side thereof, the free ends of said U-bolt being situated on each side of the flange, and engaging with the bracket and chassis.

21. In an automobile structure, a chassis, a bracket secured thereto, said bracket having a central flange and lateral flanges extending from each side thereof, a supporting lug projecting from the lower edge of the central flange, a transverse supporting member resting on said supporting lug and fitting closely to the central flange, said supporting member provided with a slot adjacent the end, a U-bolt passing through said slot and straddling the central flange, the free arms of the bolt respectively passing through the side flanges and the chassis, and means for holding the bracket, the transverse member and the U-bolt securely to the chassis.

In witness whereof we have hereunto set our hands at borough of Manhattan, city and State of New York, this twenty-ninth day of May, 1916.

ARTHUR C. MASON.
ALFRED T. STURT.

In presence of—
 ISABEL R. RICHARDS,
 CORNELIUS C. BILLINGS.